DON CARLOS TRAVIS AND CHARLES A. STUART.
BERTH CONSTRUCTION.
APPLICATION FILED MAY 15, 1918.

1,359,637.

Patented Nov. 23, 1920.
6 SHEETS—SHEET 1.

Witness:
Leonard W. Novander

Inventor
Don Carlos Travis
& Charles A. Stuart
By Offield Towle Graves & Soans Attys

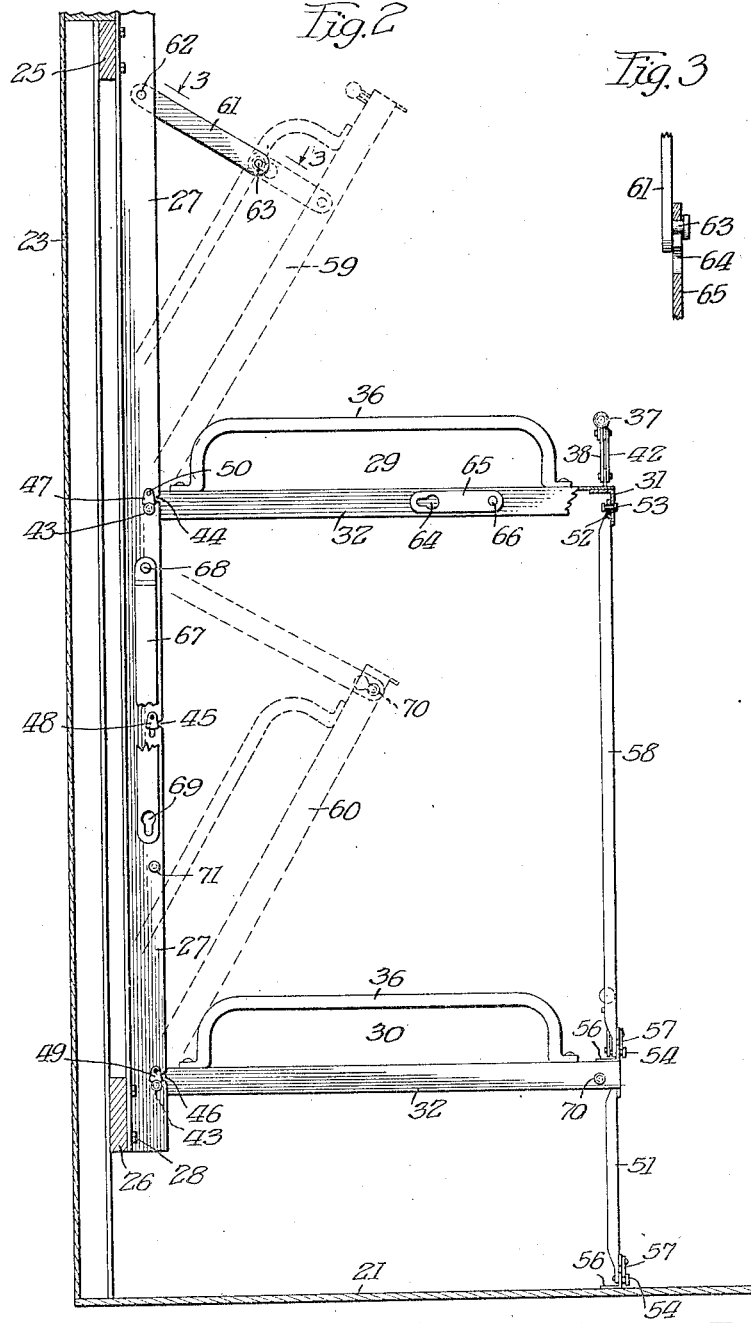

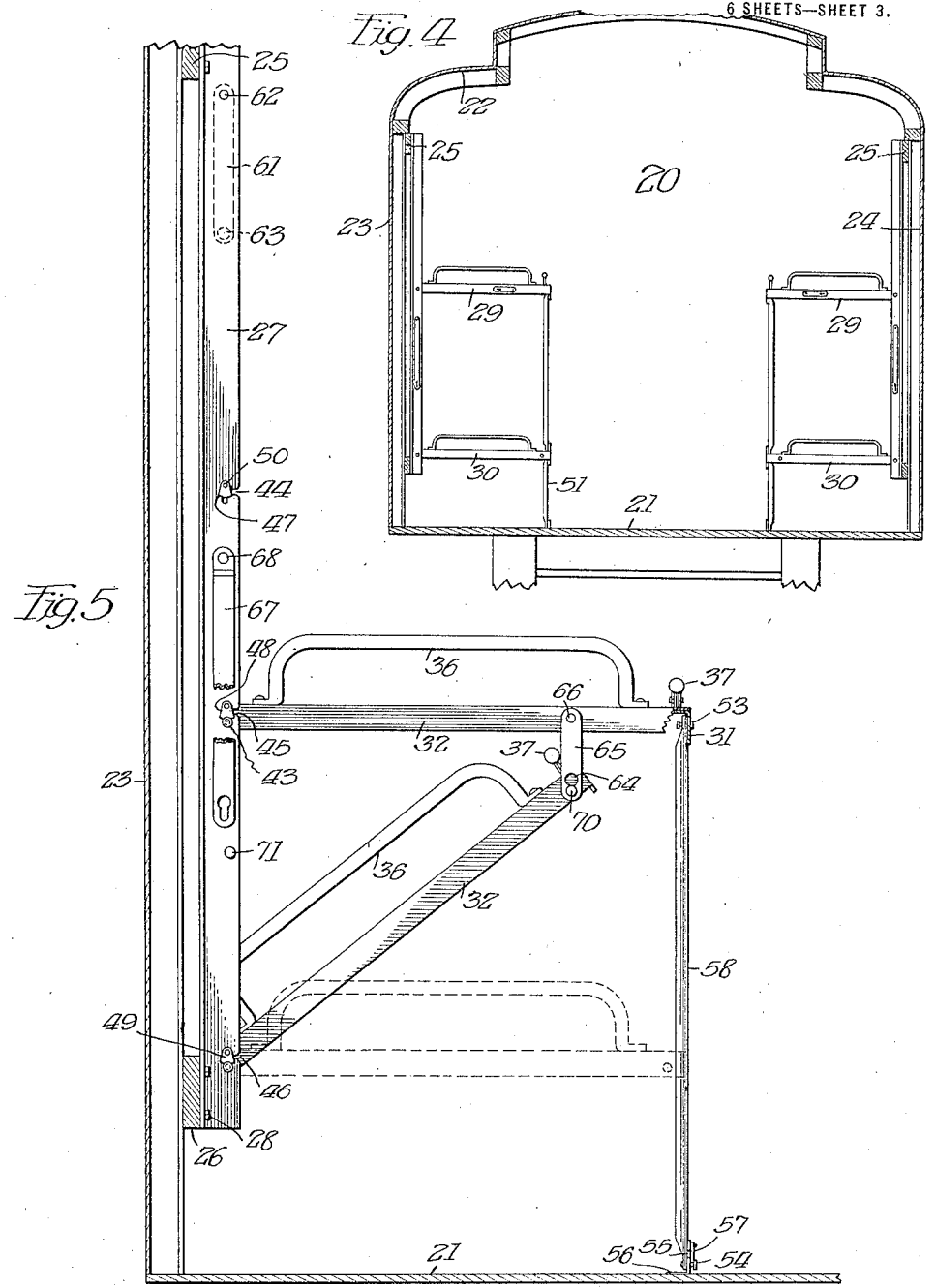

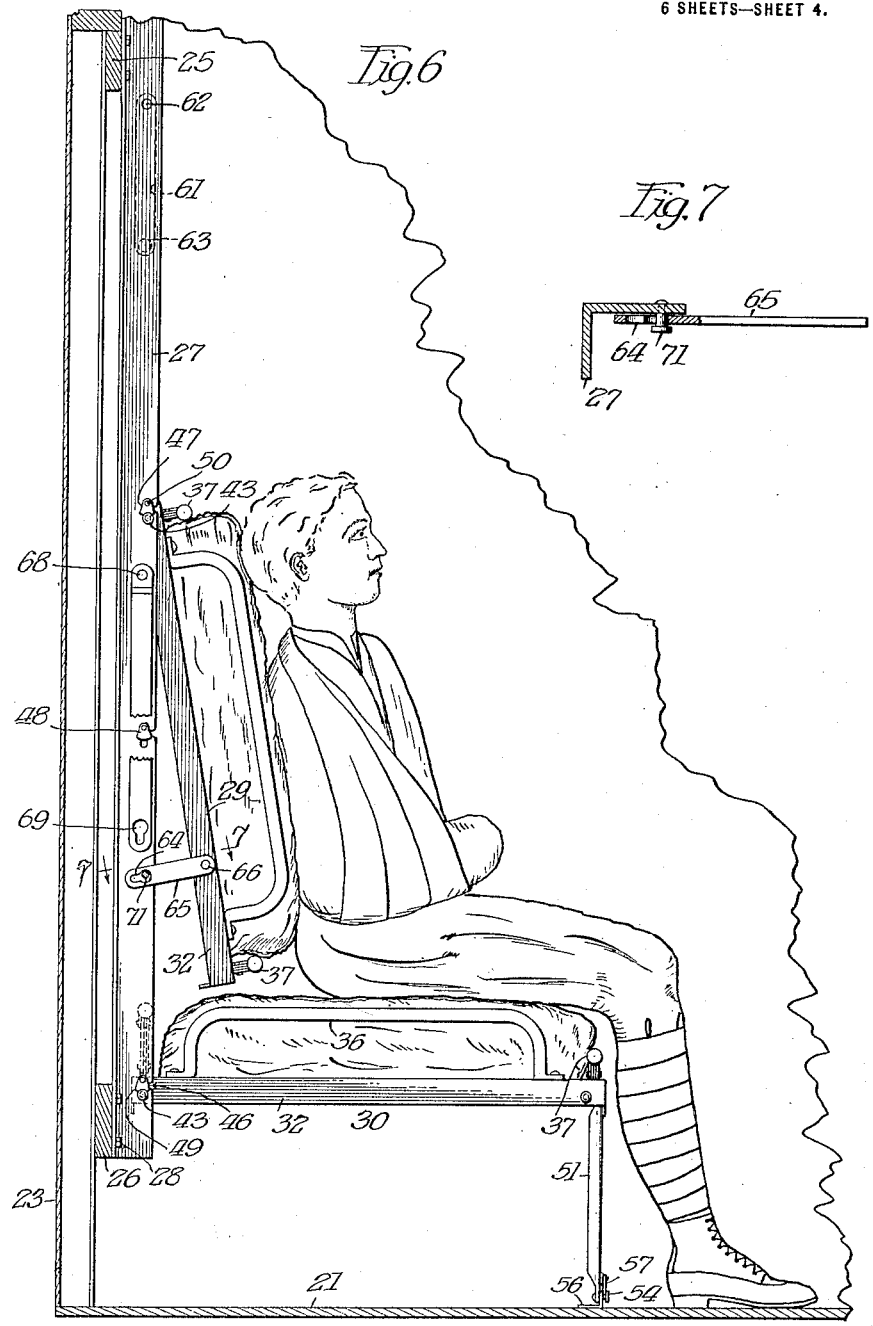

DON CARLOS TRAVIS AND CHARLES A. STUART.
BERTH CONSTRUCTION.
APPLICATION FILED MAY 15, 1918.
1,359,637.  Patented Nov. 23, 1920.
6 SHEETS—SHEET 5.
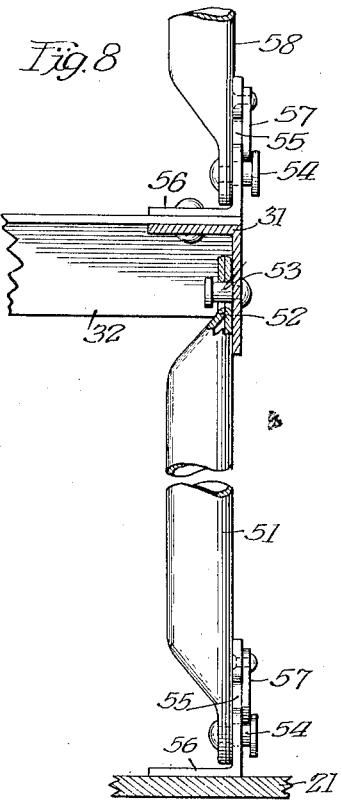
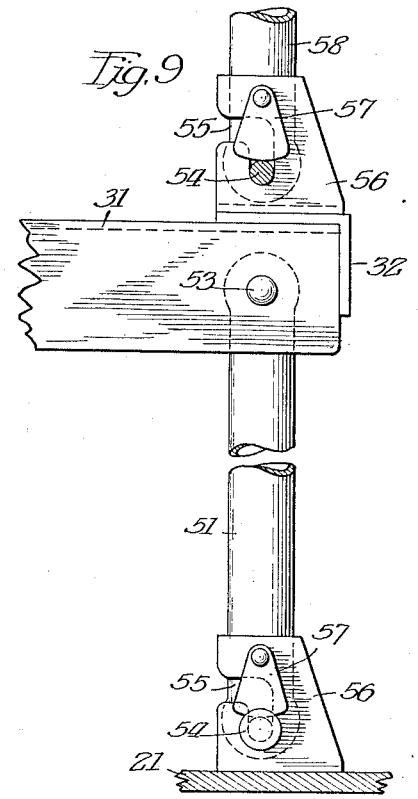
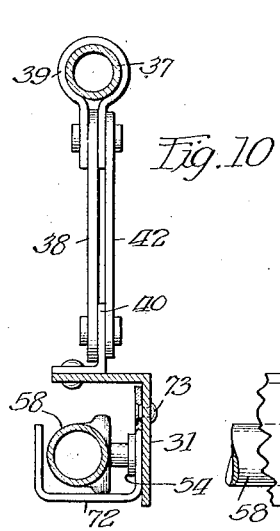
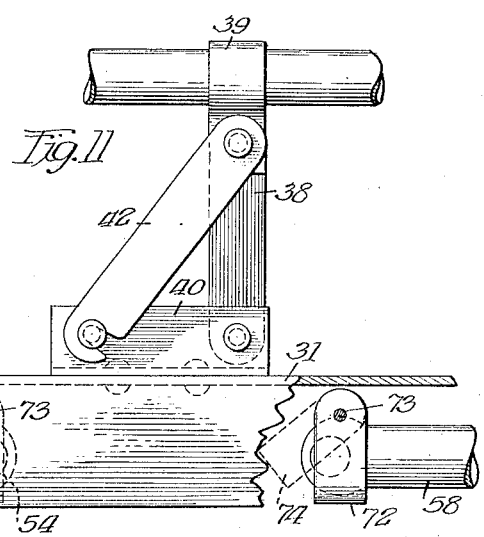
Witness:
Leonard W. Novander
Inventor
Don Carlos Travis
& Charles A. Stuart
By Offield Towle Graves & Sonns Attys DON CARLOS TRAVIS AND CHARLES A. STUART.
BERTH CONSTRUCTION.
APPLICATION FILED MAY 15, 1918.
1,359,637.
Patented Nov. 23, 1920.
6 SHEETS—SHEET 6.
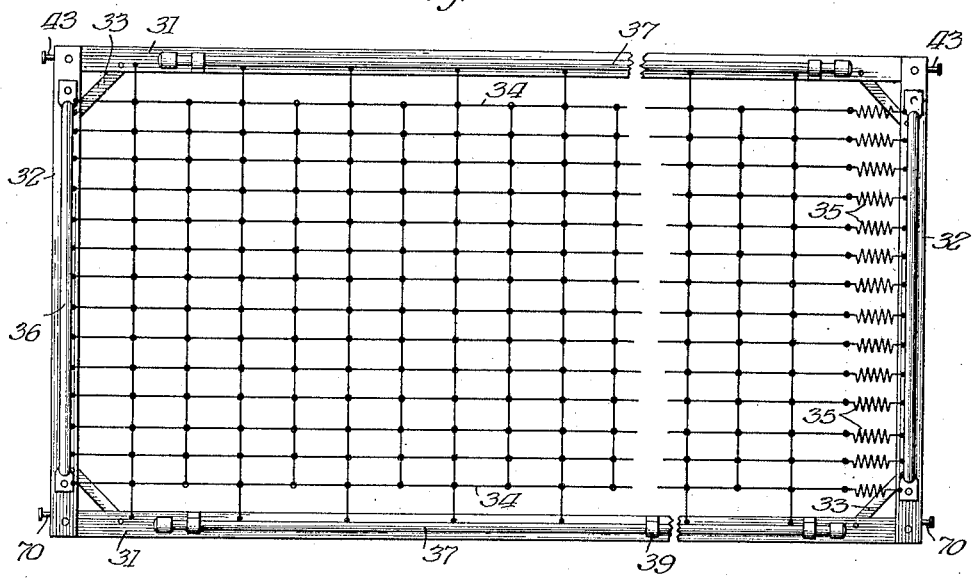
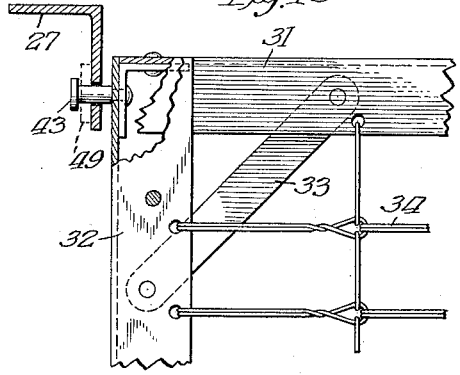
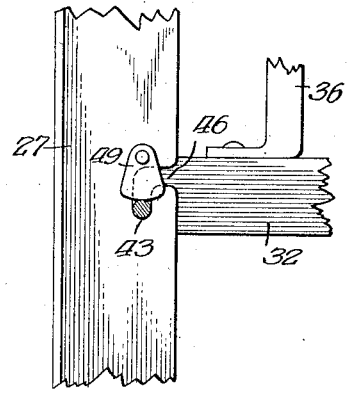

UNITED STATES PATENT OFFICE.

DON CARLOS TRAVIS AND CHARLES A. STUART, OF KENOSHA, WISCONSIN, ASSIGNORS TO SIMMONS COMPANY, OF KENOSHA, WISCONSIN, A CORPORATION OF DELAWARE.

BERTH CONSTRUCTION.

1,359,637.   Specification of Letters Patent.   Patented Nov. 23, 1920.

Application filed May 15, 1918. Serial No. 234,644.

*To all whom it may concern:*

Be it known that we, DON CARLOS TRAVIS and CHARLES A. STUART, citizens of the United States, residing at Kenosha, in the county of Kenosha and State of Wisconsin, have invented certain new and useful Improvements in Berth Construction, of which the following is a specification.

Our invention relates to improvements in berth construction and although capable of many applications, is of particular value in connection with hospital trains for which ordinary rolling stock must be converted or utilized for such service.

The principal objects of the invention are to provide a berth construction so arranged that it may be applied or installed in practically every type of railroad car, which includes, if desired, ordinary box cars; to provide a construction in which the bunks or berths can be installed on comparatively short notice and with a minimum of time, labor and inconvenience; to provide a construction in which the space consuming parts such as the bunks themselves may be detached or knocked-down and packed into a very small compass if it is desired to use the car for other than hospital purposes; to provide a construction which will admit of the usual double berth arrangement while it may be readily adjusted to accommodate sitting patients and also patients who require special attention; to provide a construction in which the individual berths or bunks with the patients occupying the same may be detached from their supports and carried in or out of the car; to provide a construction which shall be simple in design and economical to manufacture, maintain and operate and in general, to provide an improved berth construction of the character referred to.

In the drawings which illustrate one form of our invention as applied to a passenger car body, Figure 1 is a side elevation of a portion of the inside of the car showing a pair of bunks;

Fig. 2 is an end elevation of the pair of bunks shown in Fig. 1;

Fig. 3 is a section taken on the line 3—3 of Fig. 2;

Fig. 4 is a cross section through the car as a whole;

Fig. 5 is a view similar to Fig. 2 but showing the upper bunk in intermediate position;

Fig. 6 is a view similar to Fig. 2 but showing a bunk arranged for sitting patients;

Fig. 7 is a section taken on the line 7—7 of Fig. 6;

Fig. 8 is a fragmentary section taken on the line 8—8 of Fig. 1;

Fig. 9 is a side elevation of the parts shown in Fig. 8;

Fig. 10 is a section taken on the line 10—10 of Fig. 1;

Fig. 11 is a side elevation of the parts shown in Fig. 10;

Fig. 12 is a plan view of one of the bunks detached from its supports;

Fig. 13 is a fragmentary sectional plan of one of the bunk corners and the upright supporting the same on the side of the car, and Fig. 14 is an enlargement of a portion of Fig. 2.

Figure 1:
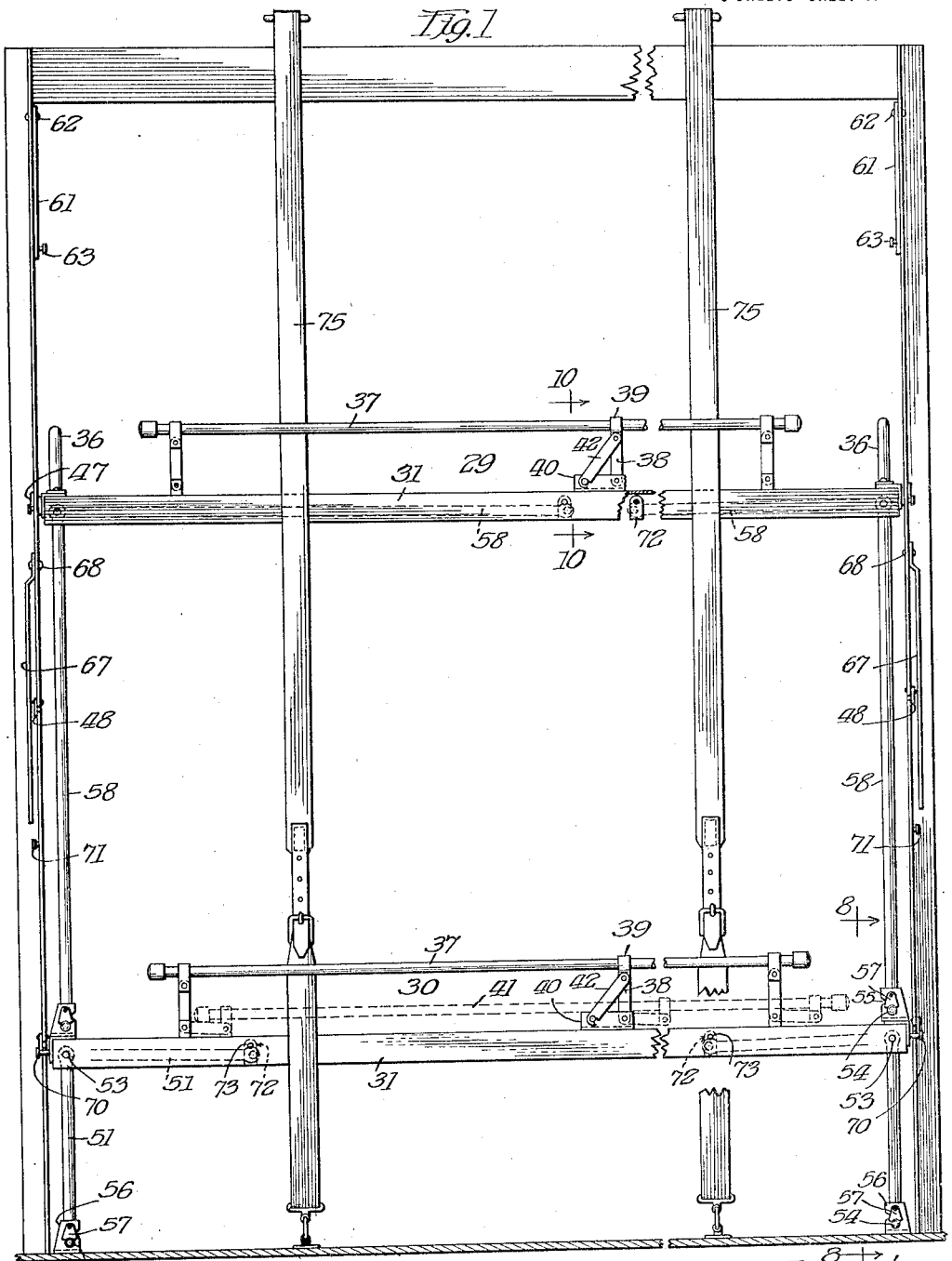

Referring to the drawings, 20 represents as a whole the body of an ordinary steam railroad passenger car which by means of our improved berth construction has been changed over into a hospital car suitable for war service. In such car body 21 is the floor of the car, 22 the roof and 23 and 24 are the respective sides of the car to which our improved berth constructions are applied. It will, of course, be understood that the usual seating equipment and other original fittings in the car which might interfere with the installation of our improved berth construction are removed before the car is converted for hospital service. Such original equipment may, however, be reinstalled in the car body in the place of the hospital berths whenever the necessity for such hospital cars is at an end.

In installing our improved hospital equipment, a pair of horizontal wooden strips or stringers 25 and 26 are nailed or bolted along and to the sides of the car body so that they extend from one end of the car to the other. To these stringers, which may conveniently be of 2x4 or 2x6 dimensions, the upright angle irons 27 may be secured by coach screws 28 or other suitable means, said angle irons 27 being arranged in pairs corresponding with the pairs of bunks with which the car is to be equipped. The respective pairs of angle iron uprights 27 are preferably spaced apart two or three inches in order to allow for proper manipulation of the supporting means and also in order to give room between the head and feet of adjacent cases.

The upper bunk designated as a whole 29, and a lower bunk designated as a whole 30, are substantially identical in their general construction. Each bunk is of angle iron construction as shown best in Figs. 8 to 12 inclusive, the angle iron sides 31 and ends 32 of the bunks being suitably braced against racking movements by the oblique strap members 33. The outer frames of the bunks furnish the support for the wire link bed bottom fabric 34; the resiliency of which is supplied by means of a series of helicals 35 connecting the ends of the link chains to the end angle irons 32 of the bunk frames. End guard rails 36 are permanently secured to the tops of the end frame members 32 and also, if preferred, side guard rails 37 may be fitted to the tops of the side frame members 31. Such side guard rails comprise longitudinal tubular members which are supported above the side angle irons 31 by means of links 38, the opposite ends of which are pivotally connected to small lugs 39 suitably secured on the guard rails 37 and to small angle iron brackets 40 secured to the tops of the side rails 31. The said links 38 constitute in effect a parallel motion by means of which the rails 37 may be moved down into the position shown in dotted lines at 41 in Fig. 1—whenever it is desired to dispense with the use of said guard rails.

Normally when the guard rails are in use the collapsing of same into folded position is prevented by small braces 42. The bunks are detachably and pivotally supported by means of small headed pins or studs projecting from the ends of the bunks at their respective corners. The pins 43 which support the rear or outer sides of the bunks are adapted to enter L-shaped slots 44, 45 and 46 cut in the inner edges of the angle iron upright 27 previously referred to, and are prevented from jumping out or otherwise becoming displaced from the said slots by means of small locking dogs 47, 48 and 49 pivotally supported on pins 50 above and in line with the vertical extending portions of the said L-shaped slots.

When the bunks are arranged as shown in full line in Figs. 1, 2 and 4, the front or inner sides of the lower bunks 30 are supported by short legs 51, the upper ends of which are flattened as shown best at 52 in Fig. 8 and perforated to loosely receive headed pins 53 riveted to the inside of the angle iron bunk frame members 31. The lower ends of the said tubular legs 51 are also flattened and to the flattened portions there are fixedly secured riveted headed pins or studs 54 which are arranged to enter front facing L-shaped slots 55 cut into small angle iron brackets 56 suitably secured to the floor of the car body. The pins 54 are prevented from becoming accidentally displaced from the said L-shaped slots 55 by means of locking dogs 57 similar in construction to the locking dogs 47, 48 and 49 previously described.

The upper bunks 29, when in the position shown in said Figs. 1, 2 and 4, are as to their front or inner sides supported by pairs of standards 58 which, in all respects, except as to their length, are similar in construction to the legs 51 which support the corresponding corners of lower bunks 30. Said standards 58 are pivotally connected at their upper ends in the same manner as the lower legs 51 and at their bottom ends are supported by the bunks 30 in the same manner as the lower ends of the legs 51 are supported on the floor of the car body.

Figs. 1, 2 and 4 show the bunks in their ordinary position when large numbers of recumbent cases are to be accommodated in the hospital train. The dotted line positions 59 and 60 in Fig. 2 show the bunks swung up partly out of the way in order to provide more room in the car when certain bunks are not occupied by patients. When in said dotted line positions the upper bunk is supported as to its upper side by means of a short strap link 61 pivoted as to its upper end to the angle iron upright 27 at the point 62. The lower end of the said link 61 is occupied with a headed stud or pin 63 which is arranged to enter a key hole slot 64 in the end of a short strap link 65 pivoted to the end angle iron frame member of the upper bunk at the point 66. Such pivotal connection 66 is preferably a somewhat tight fit so that the link 65 will normally assume and maintain the horizontal position indicated in Fig. 2. The lower bunk 30 is supported as to its upper side when in said dotted line position 60 by means of a strap metal link 67 pivoted to the upright angle iron 27 at the point 68, the lower end of the said link 67 being perforated with a key slot as shown at 69 to accommodate the headed pin 70 projecting from the outer corner of the bunk frame.

In the event that it is desired to give a dangerous case special surgical or other attention, it is usually found convenient to have his bunk arranged at a higher level than the lower bunk and at a lower level than the upper bunk. In such case the upper bunk is arranged to occupy an intermediate position as shown in Fig. 5 where it will be seen that the headed supporting pins 43 are inserted into the intermediate L-shaped slots 45 in the angle iron uprights 27. When in such intermediate position the upper bunk is maintained in horizontal relation by utilizing the upright standard 58 as a leg, the lower end of which is adapted to fit the floor bracket 56 (See Fig. 9) in view of the fact that the lower ends of the legs 51 and the standards 58 are identical in mechanical construction. In order to allow for such use of the standards 58, the lower bunk 30 is preferably strung up out of the way into oblique position as shown in Fig. 5, the upper side of the said lower bunk being then supported by means of the link 65 which has been swung down into vertical depending position to engage the headed stud 70 previously referred to.

When it is desired to use the bunks for sitting cases the upper bunk is swung down into the position shown in Fig. 6 thus constituting a back rest for the cases sitting upon the lower bunk 30. In this case the upper bunk or back rest is maintained at a comfortable angle by means of the link 65 which is swung out to engage the headed stud 71 secured in the angle iron upright 27. When the bunks are not arranged in the normal position shown in Figs. 1, 2 and 4 means must be provided to take care of the depending legs 51 or standards 58 so as to prevent them from hanging loosely and swinging around at will. Such means comprise small bails 72 (see Figs. 10 and 11) pivoted to the front angle frame members of the bunks as shown at 73. It will be readily understood that when it is desired to fold up the legs 51 or standards 58, the bails 72 are swung into inclined position as shown in dotted lines at 74 in Fig. 11 so as to admit the ends of the said tubular members, after which the locking bails 72 are moved back into vertical or full line position so as to hold securely the free ends of the said parts 51 and 58.

If desired safety straps 75 of conventional design and material may be employed to prevent the patients from being pitched out of the berths in the event that the hospital train is compelled to pass over a poor road bed at considerable speed.

The described details of construction are in no sense any limitation of our invention, the scope of which must be determined by reference to the appended claims.

We claim as our invention—

1. In berth construction, the combination of a rear upright, upper and lower bunks pivotally connected to said upright, a bottom support, a front leg pivotally connected to the lower bunk and detachably secured to the bottom support, and a front upper leg pivotally connected to one of the bunks and detachably connected to the other bunk.

2. In berth construction, the combination of a rear upright, upper and lower bunks having their rear sides adjustably connected to said upright, a front ground leg depending from and pivotally secured to the front of said lower bunk for supporting the same, a leg for the upper bunk interposed between said bunks pivotally secured to the upper bunk and detachably connected to the lower bunk, and means permitting the adjustment of said upper bunk in an intermediate lower position, the arrangement being such that the upper leg when disconnected from said lower bunk may be utilized as a ground leg for the upper bunk.

3. Berth construction comprising, a rear upright, a lower bunk provided with supporting means, an upper bunk pivotally connected to said upright, a foldable leg pivotally secured to the front of the upper bunk for supporting the front of the upper bunk, means for holding the said foldable pivoted leg in folded position parallel with the said upper bunk, and means for maintaining said upper bunk in a depending position where it constitutes a back rest for a person sitting on said lower bunk.

DON CARLOS TRAVIS.
CHARLES A. STUART.